(Model.) 2 Sheets—Sheet 1.

R. FAWCETT.
SHIFTING SEAT FOR VEHICLES.

No. 272,420. Patented Feb. 20, 1883.

WITNESSES
W. H. H. Knight
INVENTOR
R. Fawcett
By H. S. Abbot, Attorney (Model.)
2 Sheets—Sheet 2.
R. FAWCETT.
SHIFTING SEAT FOR VEHICLES.
No. 272,420.  Patented Feb. 20, 1883.
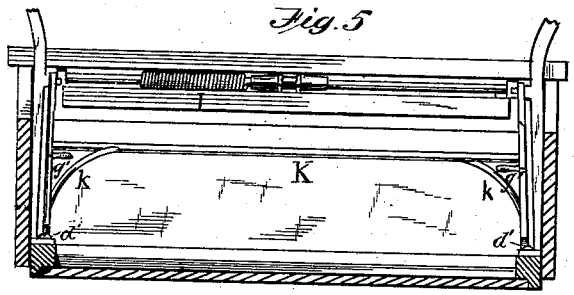
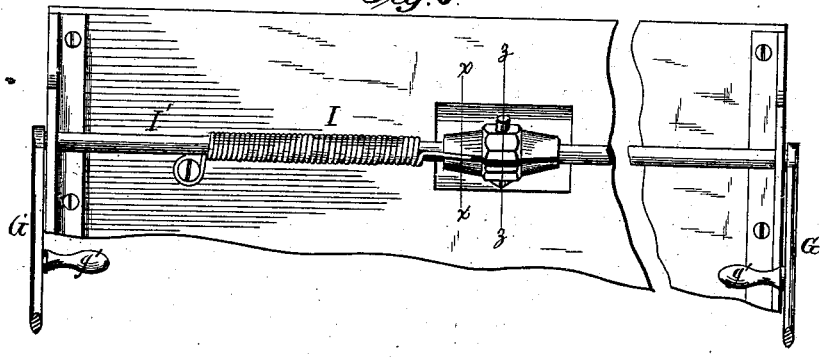
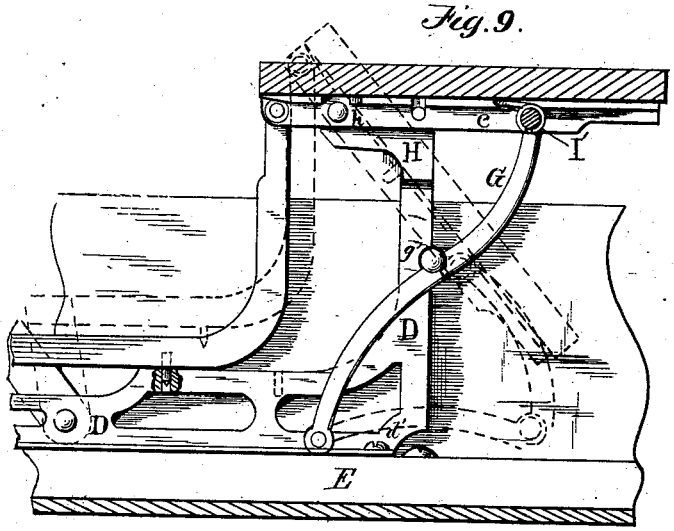
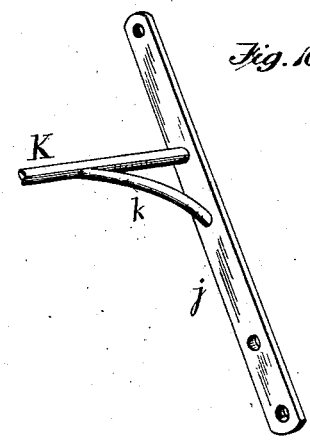
WITNESSES
W. H. Knight
Wm. G. Henderson
INVENTOR
R. Fawcett
By H. A. Abbot.
Attorney
N. PETERS, Photo-Lithographer, Washington, D. C.

UNITED STATES PATENT OFFICE.

RICHARD FAWCETT, OF SALEM, OHIO.

SHIFTING SEAT FOR VEHICLES.

SPECIFICATION forming part of Letters Patent No. 272,420, dated February 20, 1883.

Application filed May 26, 1882. (Model.)

*To all whom it may concern:*

Be it known that I, RICHARD FAWCETT, a citizen of the United States of America, residing at Salem, in the county of Columbiana and State of Ohio, have invented certain new and useful Improvements in Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in that class of vehicles termed "jump-seat wagons;" and it consists in certain devices applied to the seats and the frame of the vehicle, whereby the front seat, when not in use, is turned down and placed under the other seat, which is made to come forward, and is there locked in its position by the same device that is employed in locking both seats when the two are in use; also, in several other particular devices, all of which will be more particularly hereinafter described, and set forth in the claims.

Figure 1:
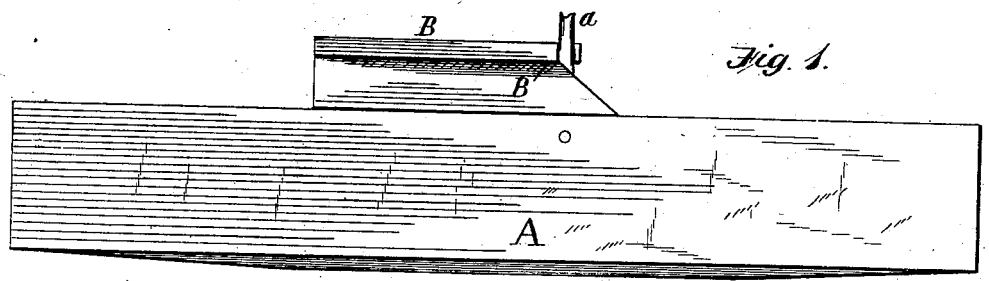
Figure 2:
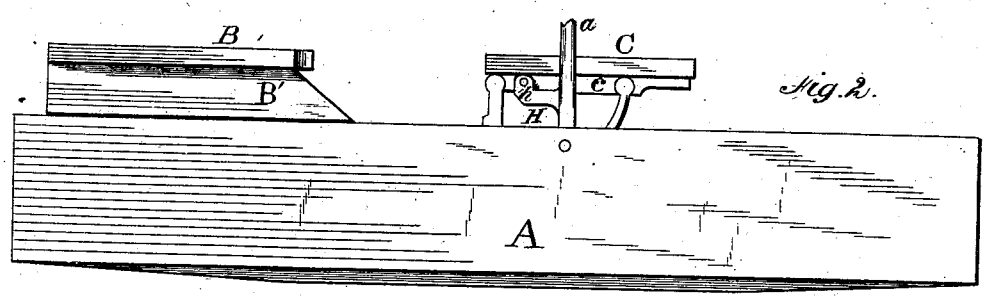
Figure 3:
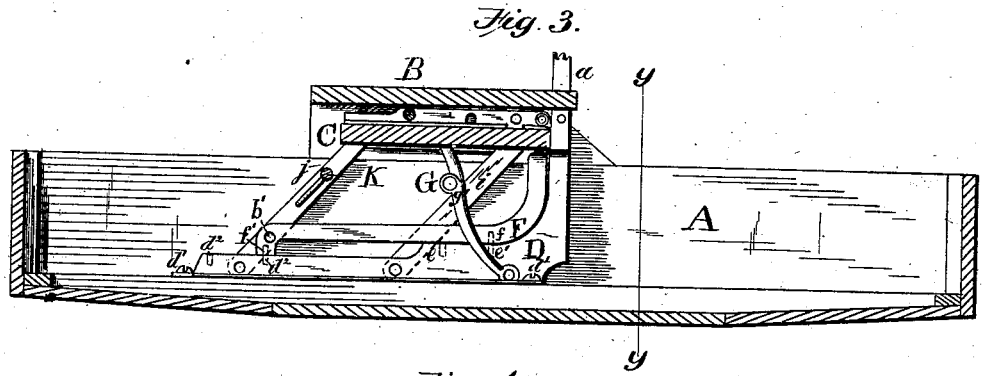
Figure 4:
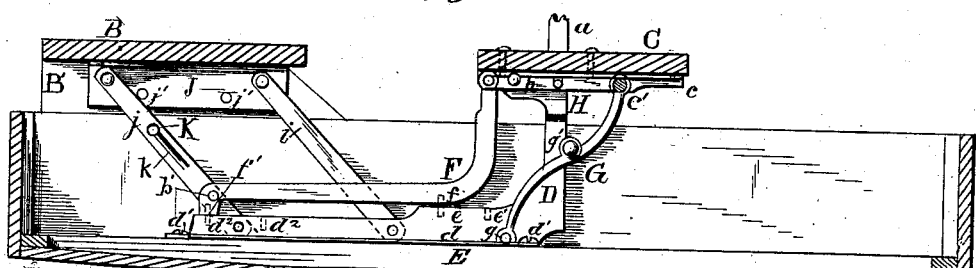

Figures 1 and 2 are side views of the vehicle, showing the different positions of the seats. Figs. 3 and 4 are interior views of Figs. 1 and 2, showing the devices used. Figs. 5, 6, 7, 8, 9, and 10 are various details which will be referred to in the general description.

A is the bed or body of the vehicle. B is the rear seat. C is the front and folding seat. D is a metal bracket secured in any suitable manner upon each side of the body, supplying an independent and stanch base for the several supports and fastenings of the seats B and C, rendering easy their location within or removal from the body for convenience in painting, upholstering, or other processes of manufacture. Said brackets serve also, when desired, to stay the posts for top vehicles, as shown by section of the posts $a$. They may be made plain or ornamental, as shown in Fig. 9. The brackets D serve another purpose—of making the seats and setting them up in working order independent of the body they may be intended to occupy. Under the front seat, C, at each end, is a flange bar, $c$, bolted to the seat. At the rear end of bar $c$ is a curved arm, F, pivoted to $c$, having the other end pivoted to the rear supporting-leg, $j$, of the other seat, B, at $b'$. In the vertical flange of the bracket D are two notches, $d^2 d^2$, and at the end of curved arm F, below the pivot $b'$, is a tenon, $f'$, to fit into either of the notches $d^2$ to aid in locking the arm F in either position. At $f$ is a projecting pin, which fits into either hole $e\ e'$ in the edge of the bracket D, which also aids in locking the arm F in either position. Through the front end of the bar $c$ is pivoted, at $c'$, a jointed curved brace, G, the lower end of which is pivoted to the vertical flange of the bracket D at $g$. There is one of these on each side of the wagon. The front seat, C, is pivoted at each end to a standard, H, at $h$, and around which the seat C revolves when thrown out of use, and turns over, as represented in Fig. 3. Under the front seat is placed a spiral spring, I. (Shown in the section, Fig. 5, and in plan, Fig. 6, Fig. 7 being section on $xx$ of Fig. 6, showing the clamp to hold the end of the spring, and Fig. 8 section on $yy$ of Fig. 6, showing the tightening-screw.) The rod I', around which the spring I is coiled, is secured at each end to the jointed curved brace G and revolves freely through bar $c$ as a pivot, so that when braces G are pulled by the handles $g' g'$, Fig. 5, the movement of the seat C, when being folded under the other seat, B, will coil up the spring I, and when in this position the curved braces are pulled out of lock the spring I will move the front seat, C, into place again, and also cause seat B to retreat to the rear by devices now to be described. At each end of seat B, secured to its under side by screws or bolts, is a plate, J, to which are pivoted the legs $i$ and $j$, which are also pivoted to the vertical flange of the bracket D. At $j' j'$ are two pins to limit the movement of the legs $i$ and $j$; but if the side pieces, B', at each end of the seat B are properly fitted they will rest firmly on the side rail of the wagon and serve the same purpose as the pins $j' j'$. The curved arms F, which are pivoted to the bottom of the rear leg of the seat B, are also pivoted to the back of the front seat, C, and by being thus connected the two seats move together, and when the front seat is unlocked and moved, either by hand or by the recoil of the spring, the rear seat is also moved. This arm F also acts as a brace to support seat C when in use, as in Fig. 4.

Fig. 10 is an enlarged view of a leg, *j*, of the rear seat, B, showing the brace-rod K and curved brace *k*, and in Fig. 5 these are shown in position under the seat B. The object of this rod, thus braced, is to connect these legs *j j* of the seat to stiffen them against side or other strains, and it may be located at any point between the arms and be made of any suitable material. This rod K and braces *k* are seen in elevation in Fig. 5 and enlarged in Fig. 10.

I claim—

1. The combination of the pivoted seat C with the curved arm F, and jointed curved locking-arm G, substantially as shown and described.

2. The combination of the leg of the rear seat, curved arm F, and pivoted front seat, substantially as shown and described.

3. The combination of the rear seat, the curved arms F, the front seat, and jointed braces and the brackets D D, substantially as and for the purpose described.

4. The arms F, having the lugs or tenons $f f'$, in combination with the brackets D D, with the notches $e$ $d^2$, substantially as and for the purpose described.

5. The brace-rod K, in combination with the legs *j j*, substantially as and for the purpose described.

In testimony whereof I affix my signature in presence of two witnesses.

RICHARD FAWCETT.

Witnesses:
JOSEPHUS R. CHISHOLM,
J. C. BOONE.